United States Patent [19]

Wickremasinghe

[11] 4,004,038

[45] Jan. 18, 1977

[54] PROCESS OF MAKING COLD WATER SOLUBLE TEA CONCENTRATES AND POWDERS

[75] Inventor: Robert L. Wickremasinghe, St. Coombs, Ceylon

[73] Assignee: Tea Research Institute of Ceylon, Ceylon

[22] Filed: Oct. 11, 1974

[21] Appl. No.: 514,329

[30] Foreign Application Priority Data

Oct. 12, 1973  Ceylon .................................. 7118

[52] U.S. Cl. ............................ 426/422; 210/23 F; 210/23 H; 210/24; 426/330.3; 426/424; 426/435; 426/597

[51] Int. Cl.² .................... A23F 3/00; B01D 13/00; B01D 15/08; B01D 31/00

[58] Field of Search .......... 426/365, 366, 193, 435, 426/422, 597, 423, 424, 490, 495, 271, 330.3; 210/23 F, 23 H, 24 C

[56] References Cited

UNITED STATES PATENTS

| 2,831,772 | 4/1958 | Herz .................................. 426/366 |
| 2,891,865 | 6/1959 | Seltzer et al. ........................ 426/435 |
| 3,148,141 | 9/1964 | Schonenberger et al. ....... 210/23 U |
| 3,151,985 | 10/1964 | Fobes ................................ 426/366 |
| 3,163,539 | 12/1964 | Barch .............................. 426/366 X |
| 3,228,877 | 1/1966 | Mahon ............................... 426/422 |
| 3,342,729 | 9/1967 | Strand ............................... 426/495 |
| 3,398,091 | 8/1968 | Greatorex .......................... 426/495 |
| 3,787,590 | 1/1974 | Borders et al. .................... 426/366 |
| 3,790,475 | 2/1974 | Eaton .............................. 210/24 C |
| 3,858,499 | 1/1975 | Scott .................................. 99/495 |
| 3,878,300 | 4/1975 | Milligan ............................ 426/422 |
| 3,878,310 | 4/1975 | Field et al. ........................ 426/422 |

FOREIGN PATENTS OR APPLICATIONS 4,615,303  4/1971  Japan ............................... 426/422

OTHER PUBLICATIONS

The Chemistry of Tea & Tea Manufacturing, 1972 – Sanderson pp. 252–256, 259, 260, 265, 268–288, 303–305.

J. Sci. Ed. Agric., 1968, vol. 19, pp. 530–534, Smith.

*Primary Examiner*—Steven L. Weinstein
*Attorney, Agent, or Firm*—Robert E. Burns; Emmanuel J. Lobato; Bruce L. Adams

[57] ABSTRACT

Cold soluble tea concentrates and powders are prepared by extracting tea leaves with hot water, selectively removing nonpolyphenolic, high molecular weight compounds from the tea extract while retaining the phenolic compounds therein and concentrating the resultant extract.

12 Claims, No Drawings

PROCESS OF MAKING COLD WATER SOLUBLE TEA CONCENTRATES AND POWDERS

BACKGROUND OF THE INVENTION

The present invention concerns a method for preparation of soluble tea concentrates and powders, particularly tea powder and cold soluble tea concentrates which are sediment and "cream" free and thus suitable for use in iced beverages.

It has been customary hitherto to prepare cold soluble tea powders or sediment free concentrates suitable for use in iced beverages, by making hot water extracts of made tea or fermented tea leaves and cooling the same to a temperature of approximately 4°–10° C. to precipitate the cream which is then removed from the supernatant liquid. Alternatively, insoluble protein or other polyphenol adsorbants are added to the extracts in order to remove part of the oxidized polyphenols responsible for cream formation. The residual liquor is then concentrated to a syrup of desired consistency or dried to a powder.

These processes suffer from the disadvantage that the sediment free concentrate or dry powder yields a brew which does not reproduce the taste and strength associated with conventional black tea brew, because the cream or oxidized polyphenols removed in these processes are precisely the constituents which provide tea with its characteristic taste. Such teas are therefore described as "Flat".

SUMMARY OF THE INVENTION

An object of the present invention is the provision of a new method for preparing soluble tea concentrates and powders, from which a tea beverage having the characteristic tea flavor may be obtained.

Another object of the present invention is the provision of a new and economical method for preparing cold soluble tea concentrates and powders, wherein the cream has been eliminated therefrom without removing the constituents which provide tea with its characteristic taste.

Still another object of the present invention is the provision of a new and economical method for preparing cold soluble tea concentrates and powders which are sediment and cream-free and suitable for use in iced beverages.

It has been discovered that the foregoing disadvantages in preparing tea extracts are avoided by the selective removal of nonphenolic compounds of high molecular weight therefrom, such as protein, polypeptides and polysaccharides and then process the resulting extract in the conventional way to obtain tea concentrates or dry powders.

According to the invention, cold soluble tea concentrates and powders are manufactured by preparing tea extract by extracting tea leaves with hot water, selectively removing nonphenolic compounds of high molecular weight from said tea extract while retaining the phenolic compounds therein and then concentrating the resultant extract to obtain a tea concentrate or powder.

DESCRIPTION OF THE INVENTION

According to the process of the invention, a tea extract is prepared by subjecting tea, such as black tea, off-grade black tea, fermented tea leaves, green tea or oolong tea to hot water extraction in the conventional way until the soluble compounds have been extracted. In the preferred commercial process, extracts are made by mixing fermented tea leaf (dhool) or black tea with boiling water and pressing the wetted leaves in a Belt Press. The dry residue from the first pressing is then remixed with boiling water and pressed again. If required, the procedure may be repeated for a third time. The proportion of fermented leaf to boiling water generally varies in the range of 1 : 0.8–1.5 in each of the successive extractions and the leaves are pressed immediately after being mixed with boiling water. In the case of black tea, the proportion of tea to boiling water is about 1 : 3–4 for the first extraction and 1 : 1 for subsequent extractions; the liquid tea is allowed to stand for about 20–30 minutes before being pressed.

Extracts prepared in the foregoing manner have been found to contain certain amino acids, polyphenols, caffeine, chlorophyll, proteins and polysaccharides. According to the invention, removal of chlorophyll, proteins and polypeptides and polysaccharides is necessary for the production of an instant tea powder which is soluble in hot or cold water; moreover, the polyphenols must not be removed, but allowed to remain in the tea extract. The polyphenols, which in accordance with the present invention are retained in the tea extract throughout the processing steps include for example, epigallocatechins, epitheaflavic acids and theaflavins and derivatives thereof of the formulas:

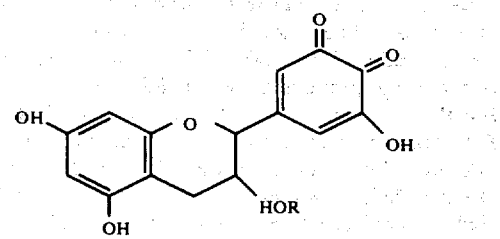

when R = H, the polyphenol is a quinone of epigallocatechin; when R = 3,4,5-trihydroxybenzoyl, the polyphenol is epigallocatechin gallate;

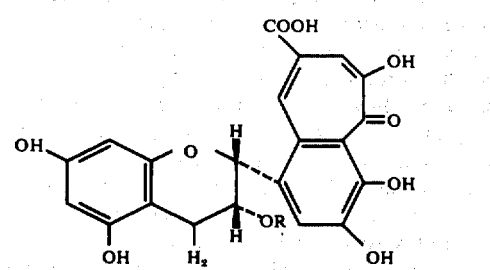

when R = H, the polyphenol is epitheaflavic acid; when R = 3,4,5-trihydroxybenzoyl, the polyphenol is 3-galloyl epitheaflavic acid;

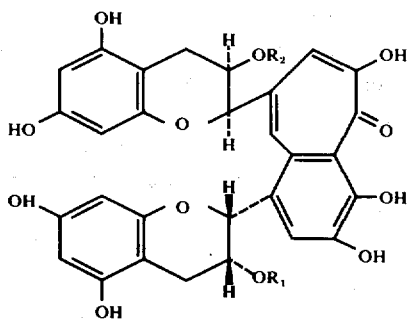

when $R_1 = R_2 = H$, the polyphenol is theaflavin; when $R_1 = H$; $R_2 = 3,4,5$-trihydroxybenzoyl, the polyphenol is theaflavin monogallate;

when $R_1 = R_2 = 3,4,5$-trihydroxybenzoyl, the polyphenol is theaflavin digallate;

According to the process of the present invention, the chlorophyll, proteins and polysaccharides are separated from the tea extract, without separating the polyphenols therefrom, by means known in the art for separating compounds of differing molecular weights and differing adsorption coefficients. Among the methods which can be used for carrying out this step of the process are filtration through gels or porous granules, ultrafiltration, reverse osmosis, adsorption chromatography and affinity chromatography.

According to a preferred embodiment of the present invention, chlorophyll, proteins and polysaccharides are removed from the extract by percolating the extract through a column containing a gel such as polymerized dextran or polyacrylamide. In particular, gel filtration through columns of different grades of Sephadex (manufactured by Pharmacia Fine Chemicals, Uppsala, Sweden), Grades G25, G50, G75, G100 and G200 being particularly preferred, or Biogel (manufactured by Bio-Rad Laboratories, U.S.A.), Grades P2, P10, and P30 being preferred has been found to be especially effective. The various grades of gel differ from each other in their degree of adsorption of polyphenol, especially galloylated flavanols and their oxidation products, as well as their exclusive limits, density and flow rates. The material which showed the most suitable combination of characteristics for the present process was found to be Sephadex G 50 (coarse).

When the tea extract is subjected to gel filtration, a turbid eluate emerges first from the column. This eluate contains chlorophyll, proteins and polysaccharides and is discarded. The clear eluate that follows is collected and the polyphenols which have been adsorbed on the column are displaced by elution with a polar organic solvent, for example, acetone, ethanol or isopropanol, or by boiling water or steam, or any other agent capable of quantatively displacing the bound polyphenols and other components of the tea remaining on the column. The pH of this eluate is adjusted, preferably within the range of about 4.9 to 5.2, when required. In cases where the pH is outside the foregoing range, it is adjusted, usually by the addition of an alkaline solution, most preferably a solution of sodium hydroxide; for convenience, a 1 to 5 N normal solution of sodium hydroxide is ordinarily used when the eluate has a lower pH than is preferred.

The resultant clear solution is then processed in the conventional manner to yield a liquid tea concentrate or powder.

Another preferred procedure in accordance with the present invention for separating compounds of high molecular weight from those of low molecular weight and from the polyphenols is by forcing the tea extract under pressure through porous granules of glass or porous granules of another solid inert material. Porous glass granules which are preferred in the present process may be obtained for example from Corning Glassworks, New York. "Corning Controlled - Pore Glass Granules" have been found to be particularly effective, especially glass granules of the CPG-10 Series. Glass granules have the advantages of inertness, high flow rates which increase linearly with pressure, ease of use and ease of sterilization. When the tea liquor is forced under pressure through the porous granules of glass, a turbid eluate immerges initially from the column, which contains the high molecular weight undesirable components. Therefore, the turbid eluate is discarded. The clear eluate that follows is collected and any compounds remaining in the column are eluted by the addition of an organic solvent, boiling water or steam or any other agent capable of quantatively displacing polyphenols and other components of the tea which still remain on the column.

The pH of the clear eluate thus collected is then adjusted, if necessary, so that it is within the desired range of about 4.9 to 5.2. An excellent grade of tea concentrate or tea powder is then found by processing the clear solution of eluate in the conventional manner.

Still another method for carrying out the present invention wherein the high molecular weight components of tea liquor, including in particular the proteins and polysaccharides while retaining the polyphenols, amino acids and caffeine is by ultrafiltration. When this procedure is applied, the membranes used for ultrafiltration sometimes become clogged with the tea extract. It was found that this problem could be overcome by adding a water soluble organic solvent, such as ethanol or acetone to the tea extract. In practice, a minor amount of organic solvent is sufficient to avoid clogging of the membrane.

Other methods useful for carrying out the present invention, wherein the undesirable high molecular weight components of tea liquor, including in particular protein and polysaccharides are removed, while retaining the desirable components which give tea its taste, in particular the polyphenols, amino acids and caffeine, include reverse osmosis, affinity chromatography and adsorption chromatography, i.e. methods wherein compounds of differing molecular weight and adsorption properties may be separated.

EXAMPLES

The following examples further illustrate the best modes currently contemplated for carrying out the present invention, but must not be construed as limiting the present invention in any manner whatsoever.

EXAMPLE 1

Forty kg. of freshly plucked leaf were withered in a trough for 16 hrs. to give 23.6 kg. of withered leaf. This was pulped in a Pirie Pulper manufactured by Weedon Engineering Co., Bedfordshire, England. The residue after squeezing was mixed with a further 18 l. of boiling water and pressed again. The two extracts (18 l. and 16 l. respectively), of fermented leaf were pooled (dry wt. 7.16 g.%) and passed through a column of Sephadex G 50 (Fine), comprising, 2 sections of the Pharmacia sectional column KS 370 manufactured by Pharmacia Fine Chemicals, Uppsala, Sweden. The initial, green and turbid eluate (20 l., containing a total solids content of 92 g. and comprising proteins, chlorophyll and polysaccharides, but devoid of caffeine, amino acids, and polyphenols) was allowed to run through. The column stack was then eluted with 90 l. of boiling water, and 5.2 l. of a brown, translucent eluate (dry wt. 2.6 g.%) followed by 30 l. of wine red clear eluate (dry wt. 3.3 g.%) were collected separately. Both eluates contained caffeine, amino acids, and polyphenols. The translucent eluate was clarified by passing through a Sharples centrifuge, when a clear solution (dry wt. 2.4 g.%) was obtained, and this was pooled with the wine red clear eluate. The pooled eluates (dry wt. 3.1 g.%), pH 5.2, were concentrated in a vacuum evaporator to a solids content of 25%, and then dried in a drum drier to give a powder which was instantly soluble in hot or cold water.

The solution (0.3% w/v) of the powder possessed all characteristics associated with a tea beverage, and remained clear on storage at 4° C. for 3 days or longer. Analysis of the powder (Table 1) showed it to be almost identical to a tea brew with respect to amino acids, caffeine and polyphenols, and two dimensional chromatography revealed a pattern of amino acids and polyphenols which confirmed its identity with a conventional tea brew.

Table 1

Comparison of properties of instant tea powder with conventional black tea of good quality

| | Instant tea powder | Black Tea |
|---|---|---|
| Polyphenols (mg./g.) | 230 | 300 |
| Theaflavin (arbitrary units) | 150 | 140 |
| Amino acids | 20 | 26 |
| Cream | — | ++ |

EXAMPLE 2

One hundred ml. of Corning Porous Glass Granules (CPG-10), Actual Pore Diameter 242 A, 80/120 mesh, were covered with water and evacuated by placing in a vacuum desiccator under reduced pressure for 20 minutes. The evacuated beads were poured into a column, 2 cm. × 20 cm., and 15 ml. of a tea extract (prepared by brewing 25 g. black tea with 250 ml. boiling water for 10 min.) were percolated through the column under a pressure of 5 psi., followed by 60 ml. of distilled water. The first eluate from the column (16 ml.) was very turbid and greenish in color, and was followed by a tea colored, translucent eluate (48 ml.), which contained polyphenols, amino acids and caffeine. This second eluate was clarified by either centrifugation or adjustment of the pH from its initial value of 4.8 to 5.1 by the addition of N NaOH. Drying, accomplished on a rotary vacuum evaporator, at 60° C., yielded a powder which was readily soluble in hot or cold water to give a beverage resembling a tea beverage prepared in the conventional manner.

EXAMPLE 3

Twenty-five g. of black tea was brewed with 250 ml. boiling water, and 200 ml. of the resultant liquor was filtered through glass wool. Fifteen ml. of absolute ethanol was added to 85 ml. of the hot liquor (temperature 60° C.), which was then passed through a laboratory scale Abcor ultrafiltration Unit manufactured by Abcor Inc., Massachusetts, U.S.A., fitted with an HFA 200 membrane, under a pressure of 15 psi. On analysis, the clear ultrafiltrate was found to contain amino acids, polyphenols and caffeine, and had a pH of 4.8, which was adjusted to pH 5.1 by the addition of N NaOH. Drying on a rotary vacuum evaporator at 60° C. yielded a powder which was readily soluble in hot water, to give a beverage resembling the liquor obtained by brewing tea in the conventional manner.

What I desire to claim and protect by Letters Patent is:

1. A process for manufacturing cold water soluble tea concentrate and powder which comprises preparing a tea extract by extracting tea leaves with hot water, selectively removing nonphenolic compounds of high molecular weight comprising chlorophyll, protein, polypeptide and polysaccharide from said tea extract while retaining polyphenolic compounds therein by subjecting said tea extract to filtration through a gel or solid material which is capable of effecting the separation of said nonphenolic compounds of high molecular weight from said tea extract which contains said polyphenolic compounds and also caffeine and amino acids and then concentrating the resultant filtered tea extract to obtain a cold water soluble tea concentrate or powder.

2. A process according to claim 1 in which said nonphenolic high molecular weight compounds are selectively removed by filtering said tea extract through a gel selected from polymerized dextran and polyacrylamide.

3. A process according to claim 1 in which said nonphenolic high molecular weight compounds are selectively removed from said tea extract by filtration through porous glass granules.

4. A process according to claim 1 in which said nonphenolic high molecular weight compounds are selectively removed by ultra-filtration.

5. A process according to claim 1 in which said nonphenolic high molecular weight compounds including chlorophyll, protein, polypeptide and polysaccharide are selectively removed by adding a minor amount of an organic solvent which is miscible with water to said tea extract in an amount sufficient to prevent clogging of an ultrafiltration membrane and then passing the tea extract containing organic solvent through an ultrafiltration membrane effective to allow the passage therethrough of said tea extract including amino acids and caffeine but not the passage of said nonphenolic high molecular compounds and collecting the tea extract which has passed through said ultrafiltration membrane.

6. A process according to claim 1 in which said nonphenolic high molecular weight compounds are selectively removed by reverse osmosis.

7. A process according to claim 1 in which said material is selected from a gel of polymerized dextran or polyacrylamide, porous glass granules and an ultrafiltration membrane.

8. A process according to claim 1, in which said material through which said tea extract is filtered is selected from a member of the group consisting of gels of polymerized dextran and of polyacrylamide, porous granules of inert solid material and an ultra-filtration membrane.

9. A process according to claim 1 in which said nonphenolic high molecular weight compounds which include chlorophyll, protein, polypeptide and polysaccharide are selectively removed from said tea extract by percolating said extract through a gel of polymerized dextran or polyacrylamide, wherein said polyphenolic, compounds are retained and said high molecular weight compounds are not retained, discarding the turbid eluate emerging initially from said gel which contains said nonphenolic high molecular weight compounds, collecting the clear eluate which then emerges from said gel, washing said gel with a solvent to elute materials including polyphenols adsorbed on said gel, collecting the eluate from said washing and combining said clear eluate with said eluate from said washing to form tea extract free from nonphenolic high molecular weight compounds.

10. A process according to claim 3 in which said washing of said gel is carried out with a polar solvent selected from polar organic solvents and water.

11. A process according to claim 1 in which said nonphenolic high molecular weight compounds including chlorophyll, protein, polypeptide and polysaccharide are selectively removed from said tea extract by forcing said tea extract through porous glass granules, discarding the turbid eluate emerging initially which contains said nonphenolic compounds, collecting the clear eluate which then emerges, washing said porous granules with a solvent to elute materials including polyphenols adsorbed thereon, collecting the eluate from said washing and combining the clear eluates and the eluate from said washing to form tea extract free from said nonphenolic high molecular weight compounds.

12. A process according to claim 11 in which said solvent used for said washing is a polar solvent.

* * * * *